(12) United States Patent
Hayami

(10) Patent No.: US 8,356,360 B2
(45) Date of Patent: Jan. 15, 2013

(54) LICENSE MANAGEMENT SYSTEM AND AUTHENTICATION METHOD FOR THE SAME

(75) Inventor: Yoshikazu Hayami, Fuchu (JP)

(73) Assignee: Canon Kabushiki Kaisha, Tokyo (JP)

( * ) Notice: Subject to any disclaimer, the term of this patent is extended or adjusted under 35 U.S.C. 154(b) by 248 days.

(21) Appl. No.: 12/838,404

(22) Filed: Jul. 16, 2010

(65) Prior Publication Data

US 2011/0023126 A1 Jan. 27, 2011

(30) Foreign Application Priority Data

Jul. 24, 2009 (JP) ................................. 2009-173716

(51) Int. Cl.
*H04L 9/00* (2006.01)

(52) U.S. Cl. .............................. 726/26; 726/27; 713/168

(58) Field of Classification Search .................. 713/150, 713/156, 168–170, 173, 175–176, 189, 192–194; 726/2–6, 10, 26–31; 705/57–59
See application file for complete search history.

(56) References Cited

U.S. PATENT DOCUMENTS

| | | | | |
|---|---|---|---|---|
| 5,771,291 A | * | 6/1998 | Newton et al. | 713/185 |
| 6,978,375 B1 | * | 12/2005 | Nusser et al. | 713/187 |
| 7,203,966 B2 | * | 4/2007 | Abburi et al. | 726/29 |
| 2005/0021992 A1 | | 1/2005 | Aida et al. | |

FOREIGN PATENT DOCUMENTS

| | | |
|---|---|---|
| JP | 2004-46708 A | 2/2004 |
| JP | 2004-158025 A | 6/2004 |
| JP | 3833652 B2 | 10/2006 |

* cited by examiner

*Primary Examiner* — Hosuk Song

(74) *Attorney, Agent, or Firm* — Fitzpatrick, Cella, Harper & Scinto

(57) ABSTRACT

In a license management system, a terminal apparatus and a server apparatus are connected via a network, and the server apparatus manages licenses of software in the terminal apparatus. In this license management system, when the server apparatus receives a request to re-authenticate a license that has previously be authenticated from the terminal apparatus, the server performs re-authentication of the license based on different pieces of terminal identification information and a plurality of pieces of device information that have been transmitted from the terminal apparatus, and a plurality of pieces of device information that have been stored due to authentication processing.

8 Claims, 14 Drawing Sheets

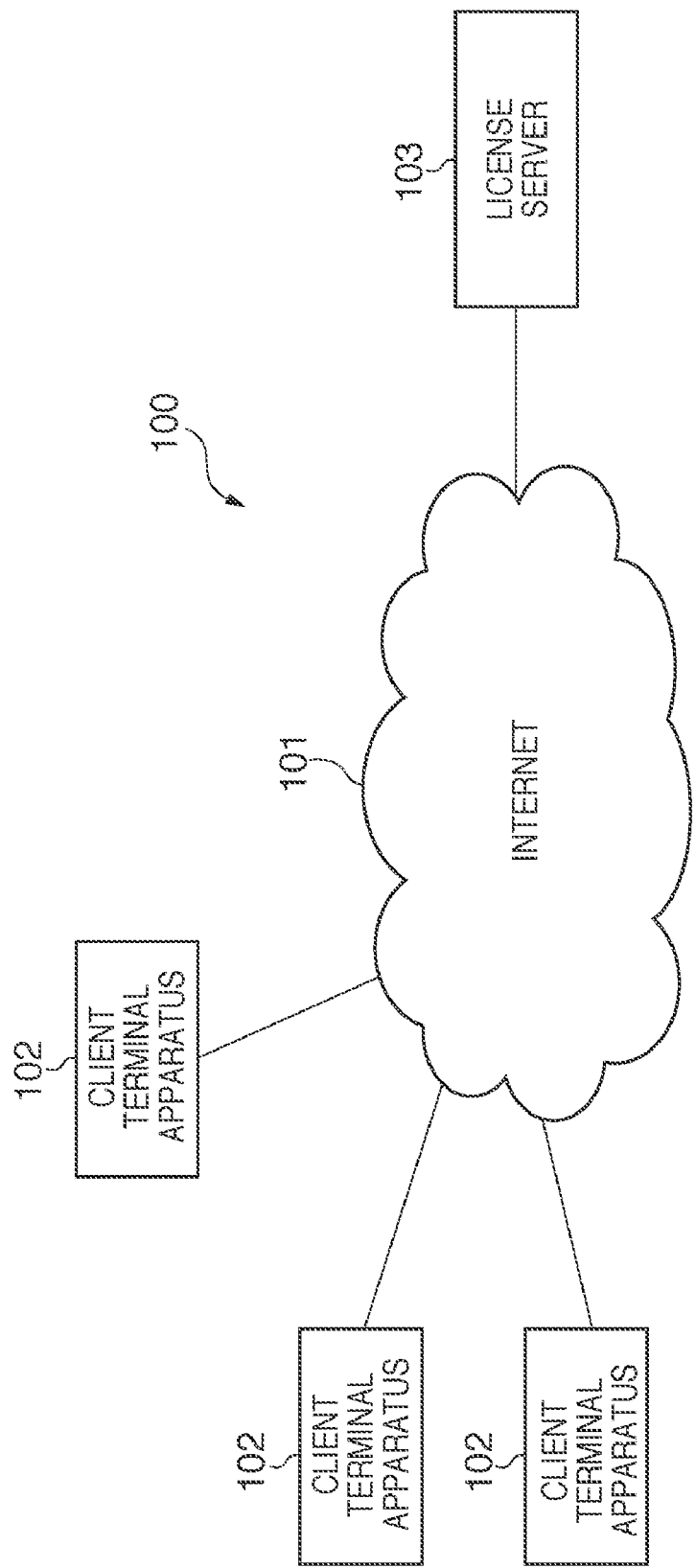

FIG. 2A

| PCID | HWID | | |
|---|---|---|---|
| PCID1 | HWID1 | HWID1 | HWID1 |
| PCID2 | HWID2 | HWID2 | HWID2 |
| PCID3 | HWID3 | HWID3 | HWID3 |
| ... | ... | ... | ... |

FIG. 2B

| LA# | PCID |
|---|---|
| LA1 | PCID1 |
| LA2 | PCID1 |
| LA3 | PCID2 |
| ... | ... |

FIG. 2C

| NUMBER | HARDWARE INFORMATION | DESCRIPTION |
|---|---|---|
| 1 | HARD DISK NUMBER | HARD DISK SERIAL INFORMATION |
| 2 | CPU SERIAL NUMBER | CPU SERIAL INFORMATION |
| 3 | MAC ADDRESS | NETWORK INTERFACE CARD SERIAL NUMBER |

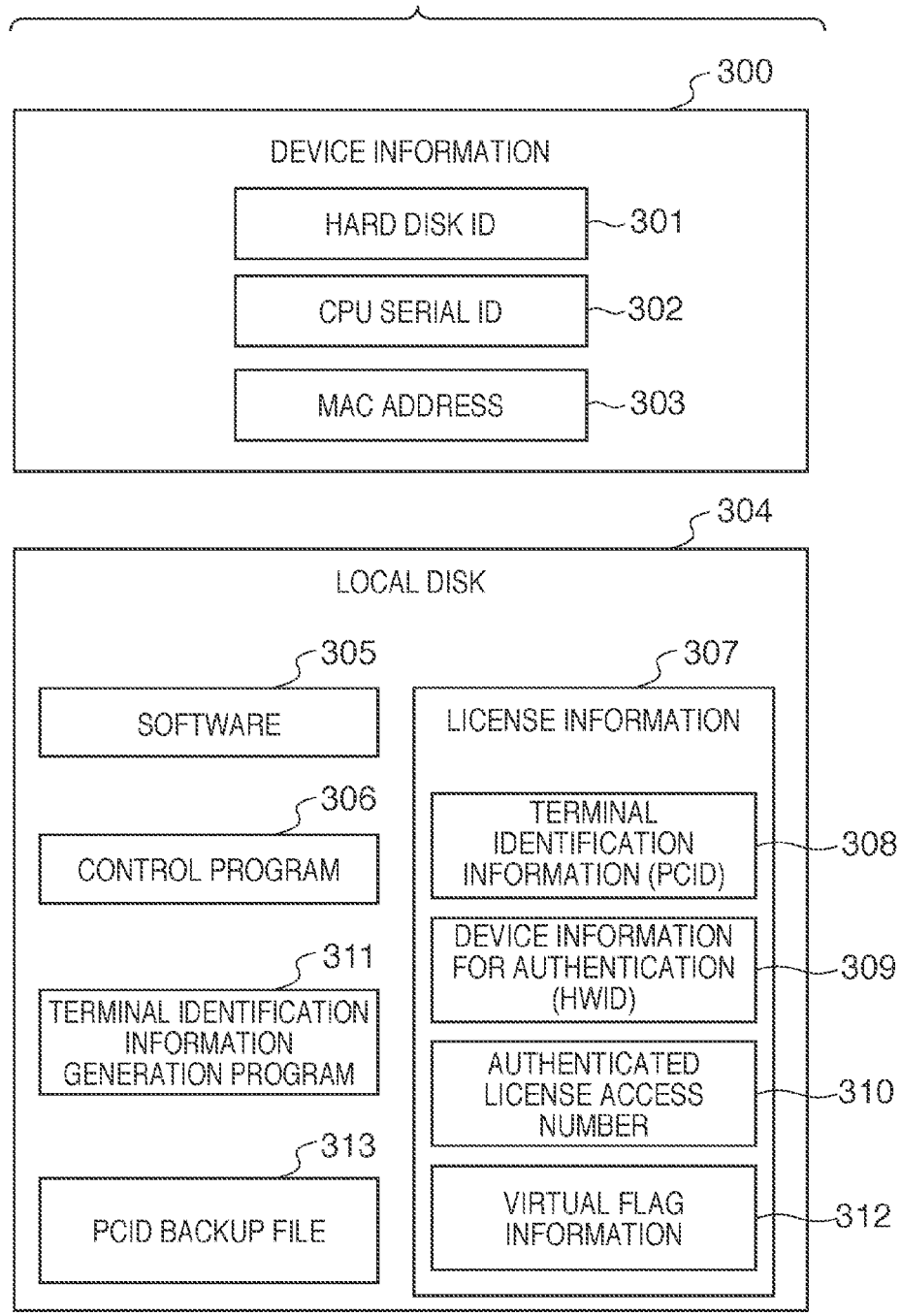

LICENSE MANAGEMENT SYSTEM AND AUTHENTICATION METHOD FOR THE SAME

BACKGROUND OF THE INVENTION

1. Field of the Invention

The present invention relates to a license management system in which a terminal apparatus and a server apparatus are connected via a network, and the server apparatus manages a license of software in the terminal apparatus, and an authentication method for the same.

2. Description of the Related Art

When selling software desired by a user, a software vendor issues the user a license that grants the use of the software. Here, the license is distributed along with the software to the user as a license access number, which is a combination of alphanumeric characters. Such a license access number (LA#) is a number uniquely assigned to each software package, and is necessary when requesting a license server to issue license information. It is sufficient for a license access number to be information necessary to make access for the purpose of license acquisition. For example, a license access number may be a code including characters and symbols, and in such a case, the license access number may be called a license access code or a license access key.

If a user (purchaser) in possession of a license discloses license access number information to a third party, it is possible for the third party to freely use the software to which the license access number was assigned. In other words, unless authentication is performed on a specified device such as a personal computer that runs the software, it is possible for the license key to be used to run the software in an arbitrary device. As a result, it is possible to create an unauthorized copy of the software that can be used by someone other than the legitimate user.

In order to prevent this, a network system is known in which communication is performed between a client terminal apparatus and a server apparatus via a network. Note that the client terminal apparatus represents one form of a terminal apparatus, and these apparatuses are equivalent in the following description.

Here, the server apparatus receives a license access number and terminal identification information that is associated with device information from the client terminal apparatus. The server apparatus determines whether the received terminal identification information and stored terminal identification information match, and transmits the result of the determination to the client terminal apparatus. When launching stored software for the first time, the terminal apparatus generates terminal identification information based on device information, and transmits the terminal identification information to the server apparatus along with a license access number. The terminal apparatus then receives, from the server apparatus, license information for determining whether the software can be used in accordance with the terminal identification information that was transmitted. The terminal identification information that was transmitted is saved to a local disk. When launching the software for the second time or thereafter, the client terminal apparatus acquires the device information, and generates terminal identification information based on the device information using the same method as when the software was launched for the first time. The client terminal apparatus compares this terminal identification information and the terminal identification information from when the software was launched for the first time that is stored in the local disk, launches the software if they match, and does not launch the software if they do not match.

If a client terminal apparatus that has a license access number has been authenticated using this system, it is possible to prevent unauthorized copying and use of the software by an apparatus other than that client terminal apparatus. See Japanese Patent No. 3833652 and Japanese Patent Laid-Open No. 2004-46708 for examples of such technology.

The above-described conventional technology proposed the idea of generating the terminal identification information based on specified device information. One example of the device information that is used is ID information (HDD ID) of the hard disk drive (HDD) connected to the client terminal apparatus. However, this case has problems such as those described below.

(1) Uniqueness of Terminal Identification Information

Although this HDD ID information is basically assigned uniquely, if the same virtualization software is used, there is known to be a phenomenon in which this HDD ID information is not unique. Consider the case in which the same virtualization software is used in personal computers (PCs) that are physically different. Virtualization software creates virtual hardware including a virtual hard disk, and can implement virtual PCs. Also, software can be installed in such virtual PCs. If HDD IDs are acquired in this situation, they will be the same value. This causes a situation in which the terminal identification information generated based on these HDD IDs will be the same. If this terminal identification information is the same, it is possible for a license access number having only one right to be used in multiple virtual PCs.

Also, it is known that user information is managed using this terminal identification information as a key. For this reason, management-related problems arise if this terminal identification information is not generated uniquely. Uniqueness is therefore required for terminal identification information.

(2) Restorability of Terminal Identification Information

There are cases where a hard disk drive needs to be replaced due to damage or the like. In such cases, the HDD ID changes after replacement, and thus the terminal identification information is always different before and after replacement. As a result, when license re-authentication is performed, the client terminal apparatus transmits terminal identification information that is different from the initially generated terminal identification information that was transmitted to the server apparatus, and the re-authentication fails. As such, after authentication has once been performed using terminal identification information, this terminal identification information used during initial authentication is necessary when re-authentication is performed.

In consideration of user convenience, there is demand for a system in which hardware can be replaced to some degree, that is to say, demand for the ability to restore terminal identification information if it has become ineffective for some sort of reason.

(3) Failure in Hardware Information Acquisition

There are cases in which the acquisition of HDD ID information fails depending on the drive specifications of the HDD. If the acquisition fails, the terminal identification information needs to be generated by some other method. Accordingly, a stable method for generating terminal identification information is required. Although the example of an HDD ID has been used here, depending on the type and model of PC, there is generally no guarantee that such information can be obtained from hardware information of hardware other than an HDD.

(4) Stability of Terminal Identification Information Generation

Also, in the case of a RAID environment in which multiple hard disks are combined and operate as a single virtual hard disk, there are nevertheless cases in which, depending on the drive specifications of the HDD, the HDD ID changes due to a trigger such as restarting the terminal. Instability in the HDD ID will result in a failure when the software is launched for the second or subsequent time. Accordingly, stability is required in the acquisition of hardware information.

SUMMARY OF THE INVENTION

The present invention provides a license management system in which license re-authentication can be performed even if terminal identification information does not match the terminal identification information used in license authentication, and an authentication method for the same.

According to one aspect of the present invention, there is provided a license management system in which a terminal apparatus and a server apparatus are connected via a network, and the server apparatus manages a license of software in the terminal apparatus, the terminal apparatus comprising: a generation unit that generates terminal identification information for identifying the terminal apparatus; and a transmission unit that, in a case of performing authentication regarding a license, transmits the terminal identification information generated by the generation unit and information regarding hardware that constitutes the terminal apparatus to the server apparatus, and the server apparatus comprising: an authentication unit that performs authentication regarding a license with respect to the terminal apparatus with use of the terminal identification information transmitted by the transmission unit; and a storage unit that, in a case where the authentication performed by the authentication unit is successful, stores the terminal identification information and the hardware information transmitted by the transmission unit along with the terminal identification information, in association with each other, wherein the authentication unit performs re-authentication regarding a previously issued license with use of the hardware information transmitted by the transmission unit and the hardware information stored by the storage unit, and in a case where, in accordance with successful re-authentication performed by the authentication unit, the terminal apparatus has received, from the server apparatus, terminal identification information stored in the storage unit in association with the hardware information used in the re-authentication, the transmission unit transmits the received terminal identification information and the hardware information when authentication regarding the previously issued license is performed.

Further features of the present invention will become apparent from the following description of exemplary embodiments with reference to the attached drawings.

BRIEF DESCRIPTION OF THE DRAWINGS

FIG. 1 is a diagram showing a network configuration of a software license management system 100 according to Embodiment 1.

FIG. 2A is a diagram showing a logical configuration of a device information database stored in a license server, FIG. 2B is a diagram showing a software information database composed of license access numbers (LA#) and terminal identification information (PCID), and FIG. 2C is a diagram showing device information.

FIG. 3 is a diagram illustrating information and programs stored in a client terminal apparatus.

DESCRIPTION OF THE EMBODIMENTS

Figure 4:
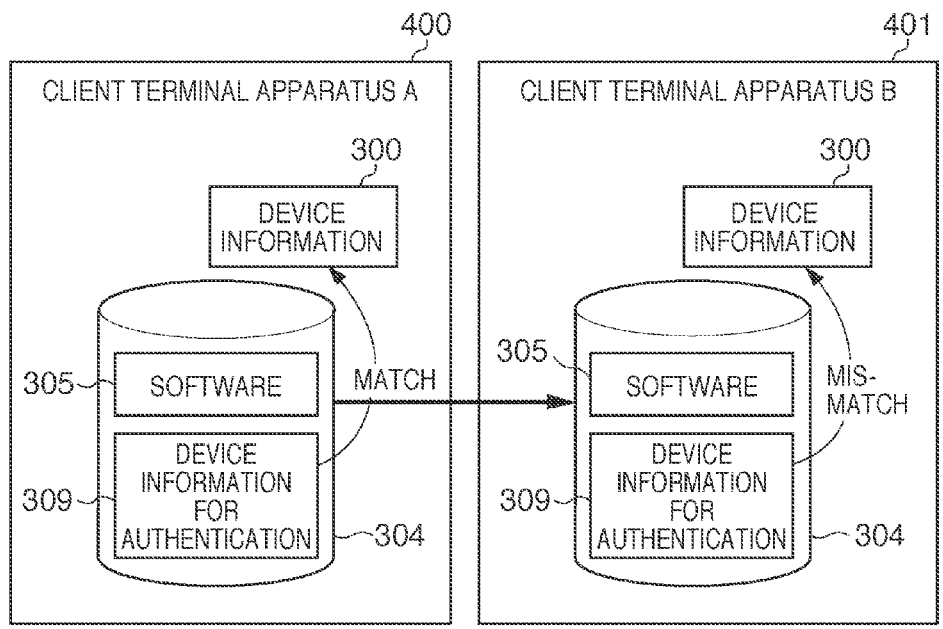
FIG. 4 is a diagram for describing a function of preventing the launch of software associated with unauthorized copying.

Below is a detailed description of embodiments of the present invention with reference to the drawings.

Embodiment 1

FIG. 1 is a diagram showing a network configuration of a software license management system 100 according to Embodiment 1. The license management system 100 includes a license server 103 as one form of a server apparatus, and a plurality of client terminal apparatuses 102. When there is no need to distinguish between the client terminal apparatuses 102, a single client terminal apparatus 102 is used in the description. Here, the client terminal apparatus 102 is a terminal apparatus configured by, for example, a personal computer that can connect to the Internet 101.

The license server 103 and the client terminal apparatus 102 can perform communication such as the transmission and reception of files via the Internet 101 with use of a predetermined protocol such as TCP/IP. TCP is an abbreviation for transmission control protocol, and IP is an abbreviation for Internet protocol.

When launching software for the first time, the client terminal apparatus 102 generates, as terminal identification information (PCID), a random value based on a GUID that is guaranteed to be a substantially globally-unique identifier. A license can be acquired by transmitting this terminal identification information as well as hardware information and a license access number (LA#) that are described later to the license server 103.

The license access number (LA#) is a number uniquely assigned to each software package, and is necessary when requesting the license server 103 to issue license information. It is sufficient for the license access number to be information necessary to make access for the purpose of license acquisition. For example, the license access number may be a code including characters and symbols, and in such a case, the license access number may be called a license access code or a license access key.

The license server 103 determines whether a license can be issued to the client terminal apparatus 102 using a determination method that is described later. Also, in the case of a request to issue a new license, the license server 103 determines that the client terminal apparatus 102 that made the request is a legitimate new client terminal apparatus 102, and then issues license information to the client terminal apparatus 102. In the case of a request to re-issue license information that was previously issued, if the license server 103 determines that the client terminal apparatus 102 that made the request is the same client terminal apparatus 102 as from before, the license server 103 re-issues the license information from before to that client terminal apparatus 102.

When software for which license information has been acquired is to be launched a second or subsequent time, the client terminal apparatus 102 acquires device information of the client terminal apparatus 102 in accordance with a control program, and compares the acquired device information with device information for authentication that is stored in a local disk. The client terminal apparatus 102 launches the software if the pieces of device information match, and does not launch the software if the pieces of device information do not match.

In this way, the client terminal apparatus 102 launches the software only if there is a match between the license information acquired when the software was initially launched and the device information of the client terminal apparatus 102 acquired when the software is to be launched the second or subsequent time. This enables preventing software that has been copied from the client terminal apparatus 102 that acquired license information from being launched on another client terminal apparatus.

The license server 103 stores terminal identification information pieces that are respectively assigned to the client terminal apparatuses 102, a plurality of unique device information pieces, and license access numbers that have been transmitted from the client terminal apparatuses 102, in association with each other.

FIG. 2A is a diagram showing a logical configuration of a device information database stored in the license server 103. The device information database is a database made up of pieces of terminal identification information (PCID) and pieces of device information for authentication (HWID) that correspond thereto. In Embodiment 1, it is envisioned that three pieces of hardware information are used as the device information for authentication.

FIG. 2B shows a software information database made up of license access numbers (LA#) and pieces of terminal identification information (PCID). The software information database records, for each license access number (LA#), information indicating software whose license has been authenticated for a user through the license server 103. Each time a license of software is authenticated for a user through the license server 103, the license server 103 stores this information indicating the software.

The license server 103 can determine which license access number has been authenticated for which client terminal apparatus 102 by referencing the software information database. The software information database also stores license access numbers and pieces of terminal information including received terminal identification information identifying client terminal apparatuses. As shown in FIG. 2B, the same PCID1 has been assigned to different license access numbers (LA1 and LA2), and this indicates that two different pieces of software were authenticated for the same client terminal apparatus.

Although any hardware information that is specific to the client terminal apparatus 102 can be used as the later-described device information, in Embodiment 1, three pieces of hardware information are used, as shown in FIG. 2C.

With computers such as the client terminal apparatus 102, parts such as the local disk are routinely replaced. For this reason, if information regarding an easily replaced part is used as device information, and that part is replaced, the client terminal apparatus 102 will no longer be able to be authenticated. It is therefore desirable to use information regarding a part that is highly important and also not likely to be replaced in the client terminal apparatus 102. Specifically, the CPU serial number is used as device information. Besides the CPU serial number, a product number stored in the BIOS (Basic Input/Output System) may be used.

A license access number is disclosed to the purchaser at the time of purchase. The user then uses the assigned license access number to authenticate the license for the application software via the Internet 101.

FIG. 3 is a diagram illustrating information, programs, and the like stored in the client terminal apparatus 102. As shown in FIG. 3, the client terminal apparatus 102 holds device information 300, software 305, a control program 306, a terminal identification information generation program 311, license information 307, and the like. Here, the license information 307 is information written to the client terminal apparatus 102 when the license of the software 305 has been authenticated. The license information 307 of Embodiment 1 includes terminal identification information (PCID) 308, device information for authentication (HWID) 309, and an authenticated license access number 310.

Also, as shown in FIG. 3, the software 305, the control program 306, the terminal identification information generation program 311, and the license information 307 are stored in a local disk 304. Note that a PCID backup file 313 and virtual flag information 312 included in the license information 307 are used in Embodiment 3.

Meanwhile, the device information 300 is information written to a CPU, a hard disk, a network adapter, and the like. The device information 300 includes a hard disk ID 301, which is a value that the hard disk manufacturer uniquely assigns to the hard disk in manufacturing. A CPU serial ID 302 is a value that the CPU manufacturer uniquely assigns to the CPU in manufacturing. Also, a MAC address 303 is serial information of the network interface card.

Although the three pieces of information described above are used as device information in Embodiment 1, it is possible for, for example, a plurality of MAC addresses to be used since with recent PCs it is highly possible to be able to acquire two or more values for wired communication, wireless communication, and the like. As other examples, it is also conceivable to use a system UUID, which is unique information for specifying the system, a BIOS serial, which is serial information regarding the BIOS, and a board serial, which is serial information regarding the motherboard.

The software 305 and the control program 306 were stored in the local disk 304 when the user installed the software 305. Also, the license information 307 is stored in the local disk 304 by the control program 306 when the license server 103 has normally authenticated the license when the software 305 is launched for the first time. The license information 307 of Embodiment 1 includes the terminal identification information 308, the device information for authentication 309, and the authenticated license access number 310.

The terminal identification information 308 is generated randomly by the terminal identification information generation program 311, and is a globally uniquely assigned value. The device information for authentication 309 is the device information 300 that was read out by the control program 306 and stored to the local disk 304 when the client terminal apparatus 102 acquired the license information of the software 305 (i.e., when the software 305 was launched for the first time).

Note that when the software 305 is to be launched for the second or subsequent time, the device information for authentication 309 and the device information 300 are compared, and the software 305 is launched only if they match. Here, the result of the determination regarding matching is affirmative if, for example, half or more of the pieces of information included in the device information (hardware information) 300 are matching. Specifically, in the case where three pieces of hardware information are included as in Embodiment 1, the result of the determination regarding matching is affirmative if two or more of the pieces of hardware information are matching. This enables permitting authentication only if the hardware configuration has not changed significantly.

Also, the criteria for this determination may be changed depending on the number of pieces of hardware information that are held or the types of hardware information, and there is no particular limitation on the criteria.

FIG. 4 is a conceptual diagram for describing a function of preventing the launch of the software 305 associated with unauthorized copying. A client terminal apparatus A 400 is a client terminal apparatus whose software 305 has been authenticated after being properly installed. On the other hand, a client terminal apparatus B 401 is a client terminal apparatus whose software 305 has been copied from the client terminal apparatus A 400.

The device information for authentication 309 stored in the local disk 304 of the client terminal apparatus A 400 is the same as the device information 300 of the client terminal apparatus A 400. For this reason, the uniformity of the device information for authentication 309 and the device 300 is confirmed, and the software 305 can be launched.

Meanwhile, the local disk 304 of the client terminal apparatus B 401 stores a copied image of the local disk 304 of the client terminal apparatus A 400. In other words, exactly the same data is stored in the local disks 304 of both the client terminal apparatus A 400 and the client terminal apparatus B 401. However, the information included in the device information 300 of the client terminal apparatus B 401 is different from the device information authentication 309 that was stored by copying. Accordingly, even if the user attempts to launch the software 305 using the client terminal apparatus B 401, the software 305 cannot be launched since the device information for authentication 309 and the device information 300 are different.

In this way, the client terminal apparatus 102 compares the device information for authentication 309 in the local disk 304 and the device information 300 unique to the client terminal apparatus 102. For this reason, as shown in FIG. 4, even if the local disk 304 of the client terminal apparatus A 400 is attached as is to the client terminal apparatus B 401, the software 305 cannot be launched using the client terminal apparatus B 401.

Furthermore, if the software 305 is simply copied to another computer, the copied software 305 cannot be launched since the device information for authentication 309 does not originally exist in the local disk 304 of the computer that is the copy destination.

Also, if the device information for authentication 309 is stored in the same directory as the software 305, and the entire directory is copied to another computer, the device information for authentication 309 will also be copied to the other computer. However, since the device information of the other computer is different from the copied device information, the software 305 cannot be launched on the computer that is the copy destination.

Figure 5:
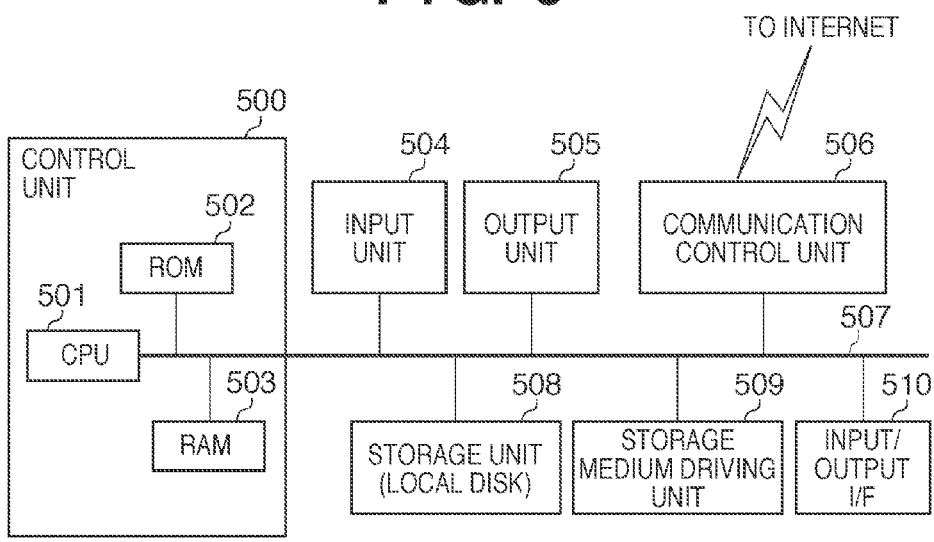
FIG. 5 is a diagram showing an exemplary hardware configuration of a client terminal apparatus.

FIG. 5 is a diagram showing an exemplary hardware configuration of the client terminal apparatus 102. The client terminal apparatus 102 is configured by a terminal apparatus such as a desktop personal computer, a portable personal computer, or the like. The client terminal apparatus 102 includes a control unit 500 to which an input unit 504, an output unit 505, a communication control unit 506, a storage unit 508, a storage medium driving unit 509, and an input/output interface (I/F) 510 are connected via a bus line 507. The bus line 507 mediates the transmission and reception of data signals, control signals, and the like between the control unit 500 and the other constituent elements.

The control unit 500 is configured from a CPU 501, a ROM 502, a RAM 503, and peripheral circuits that are not shown. The CPU 501 performs various types of calculations, information processing, overall control of the client terminal apparatus 102, and the like in accordance with a predetermined program.

In Embodiment 1, the CPU 501 launches the control program 306, acquires license information when the software 305 is launched for the first time, performs authentication when the software 305 is launched for the second or subsequent time, executes the software 305, and so on. The ROM 502 is a read-only storage apparatus that stores data, parameters, various types of programs according to which the CPU 501 performs control and various types of calculations, and the like. The CPU 501 can read programs, data, parameters, and the like from the ROM 502, but cannot overwrite or delete them.

The RAM 503 is a random access storage apparatus used as a working memory for the CPU 501. The CPU 501 can write programs, data, and the like to the RAM 503, and also delete them. In Embodiment 1, an area can be retained in the RAM 503 to be used by the CPU 501 for acquiring license information, launching the software 305, and the like.

The input unit 504 is configured by an input apparatus such as a keyboard or a mouse. A keyboard is an apparatus for inputting information such as letters and numbers to the client terminal apparatus 102, and is configured from keys for inputting kana, English characters, and the like, a numeric keypad for inputting numbers, various types of function keys, cursor keys, and other keys.

The keyboard can be used, for example, by the user to input, to the client terminal apparatus 102, a license access number that is to be transmitted to the license server 103. A mouse is a pointing device. In the case where the client terminal apparatus 102 is operated using a GUI (Graphical User Interface) or the like, predetermined information can be input by using the mouse to click buttons, icons, and the like that are displayed on a display apparatus. For example, a configuration is possible in which an icon representing the software 305 is displayed on the display apparatus after the software 305 has been installed, and the software 305 is launched by, for example, clicking the icon with the mouse.

The output unit 505 is configured by an output apparatus such as a display apparatus or a printing apparatus. A display apparatus is an apparatus configured by a CRT, a liquid crystal display, a plasma display, or the like, and is for presenting information on a screen. The display apparatus can display the result of input performed using the keyboard or mouse, a screen (user interface) provided by the software 305, or the like.

The printing apparatus is configured by any of various types of printers such as an inkjet printer, a laser printer, a thermal transfer printer, or a dot matrix printer. The printing apparatus can print output results (documents, images, and the like) to a printing medium such as paper.

The communication control unit 506 is a control unit for connecting the client terminal apparatus 102 to various types of server apparatuses (e.g., a web server or a mail server) via the Internet 101, and is configured by, for example, a modem, a terminal adapter, or another apparatus.

Communication via the Internet 101 is performed using, for example, TCP/IP (Transmission Control Protocol/Internet Protocol) or another protocol. The communication control unit 506 establishes and maintains communication between the client terminal apparatus 102 and the license server 103, receives the license information of the software 305, and so on.

The storage unit 508 is configured by a readable and writable storage medium and a driving apparatus for reading/writing programs and data from/to the storage medium. Although mainly a hard disk is used as the storage medium, it is possible for the storage medium to be configured by, for example, a magneto-optical disk, a magnetic disk, a semiconductor memory, or another readable and writable storage medium. In Embodiment 1, the local disk 304 configured by a hard disk is used as the storage unit 508.

The storage unit 508 stores the above-described license information 307 including the device identification information 308 and the device information for authentication 309, as well as the software 305 and the control program 306. The storage unit 508 also stores, for example, kanji-kana conversion software for converting kana into kanji, and browser software for displaying on the output unit 505 web pages transmitted from the license server 103 and other server apparatuses. The storage unit 508 furthermore stores, for example, a communication program that controls the communication control unit 506 and maintains communication via the Internet 101, and basic software (an OS) for causing the client terminal apparatus 102 to perform memory management, file input/output management, and the like.

The storage medium driving unit 509 is a driving apparatus for driving a detachable storage medium and reading/writing data. Examples of a detachable storage medium include a magneto-optical disk, a magnetic disk, magnetic tape, a semiconductor memory, paper tape into which data is punched, and a CD-ROM. Note that a CD-ROM and paper tape can only be used for reading.

The input/output interface 510 is configured by, for example, a serial interface or an interface of another standard. The functionality of the client terminal apparatus 102 can be extended by connecting an external device that is compatible with the input/output interface 510 to the input/output interface 510. Examples of such an external device include a storage device such as a hard disk, as well as a speaker and a microphone.

Figure 6:
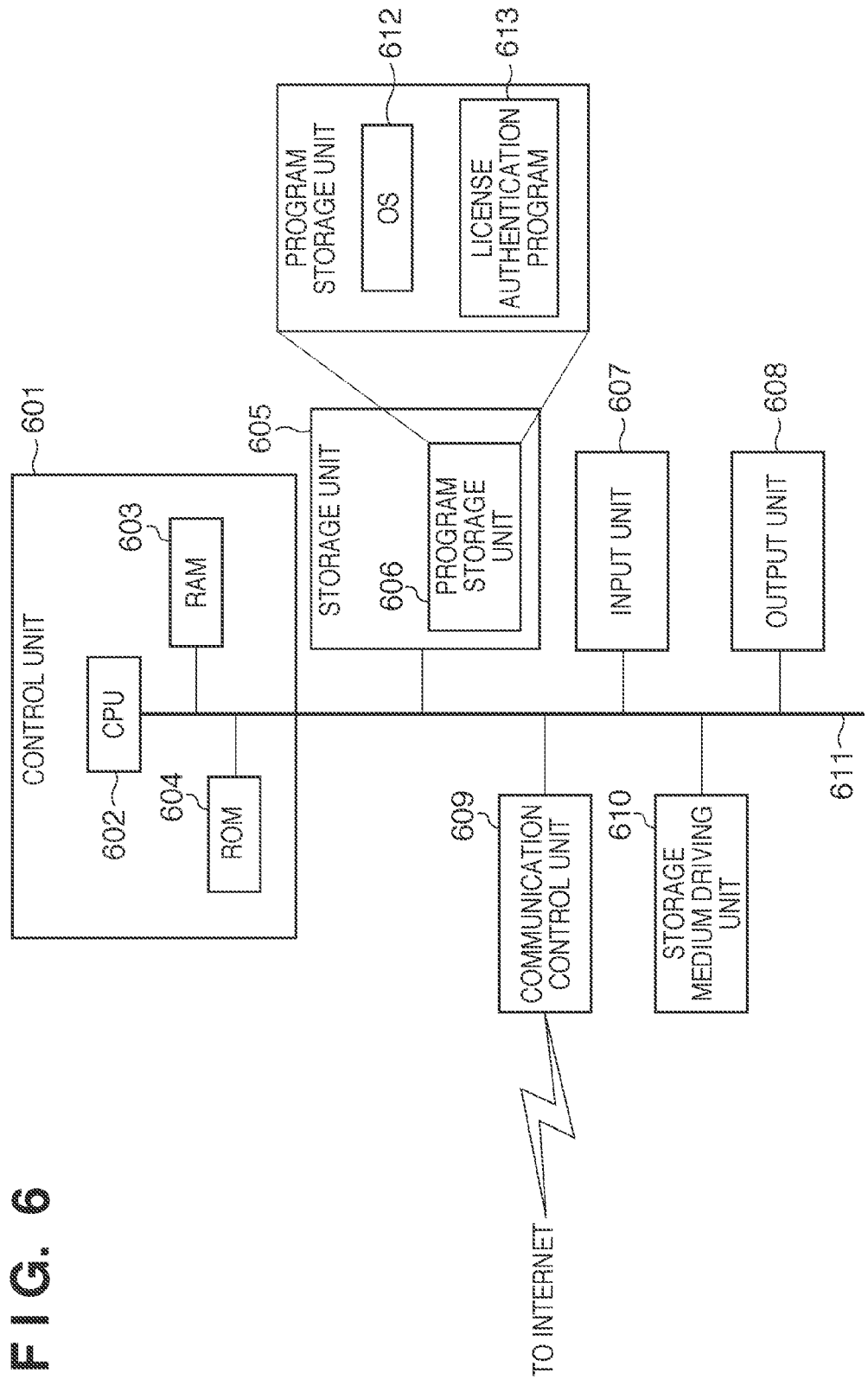
FIG. 6 is a diagram showing an exemplary hardware configuration of the license server.

FIG. 6 is a diagram showing an exemplary hardware configuration of the license server 103. Note that a control unit 601, an input unit 607, an output unit 608, a communication control unit 609, and a storage medium driving unit 610 have the same functions as the control unit 500, the input unit 504, the output unit 505, and the storage medium driving unit 509 shown in FIG. 5, and therefore descriptions thereof have been omitted.

A storage unit 605 is a readable and writable storage medium configured by a large-capacity hard disk or the like, and is provided with a program storage unit 606 and the like. The program storage unit 606 stores an OS 612, a license authentication program 613, and other programs. The license authentication program 613 is a program for causing a CPU 602 to realize a function for authenticating license issuing.

The CPU 602 launches the license authentication program 613 and compares terminal identification information, device information, and a license access number that have been transmitted from the client terminal apparatus 102 with the database stored in the license server 103. The CPU 602 then makes a determination regarding the terminal identification information of the client terminal apparatus 102, determines whether the license can be authenticated, and transmits the result to the client terminal apparatus 102.

The communication control unit 609 is a function unit for communicating with the client terminal apparatus 102, other terminals, server apparatuses, and the like via the Internet 101. The communication control unit 609 has functions for receiving terminal information, issuing license information for transmitting license issue permission information to the client terminal apparatus 102, and the like.

The license server 103 receives a comparison request for the terminal identification information, device information, and license access number from the client terminal apparatus 102, and compares them with the database. This functionality is realized by causing the CPU 602 of the license server 103 to operate in accordance with a comparison program.

Although the license server 103 acquires the license access number and device information from the client terminal apparatus 102 and authenticates them in Embodiment 1, a configuration is possible in which the authentication is performed by a database server that is separate from the license server 103.

Figure 7:
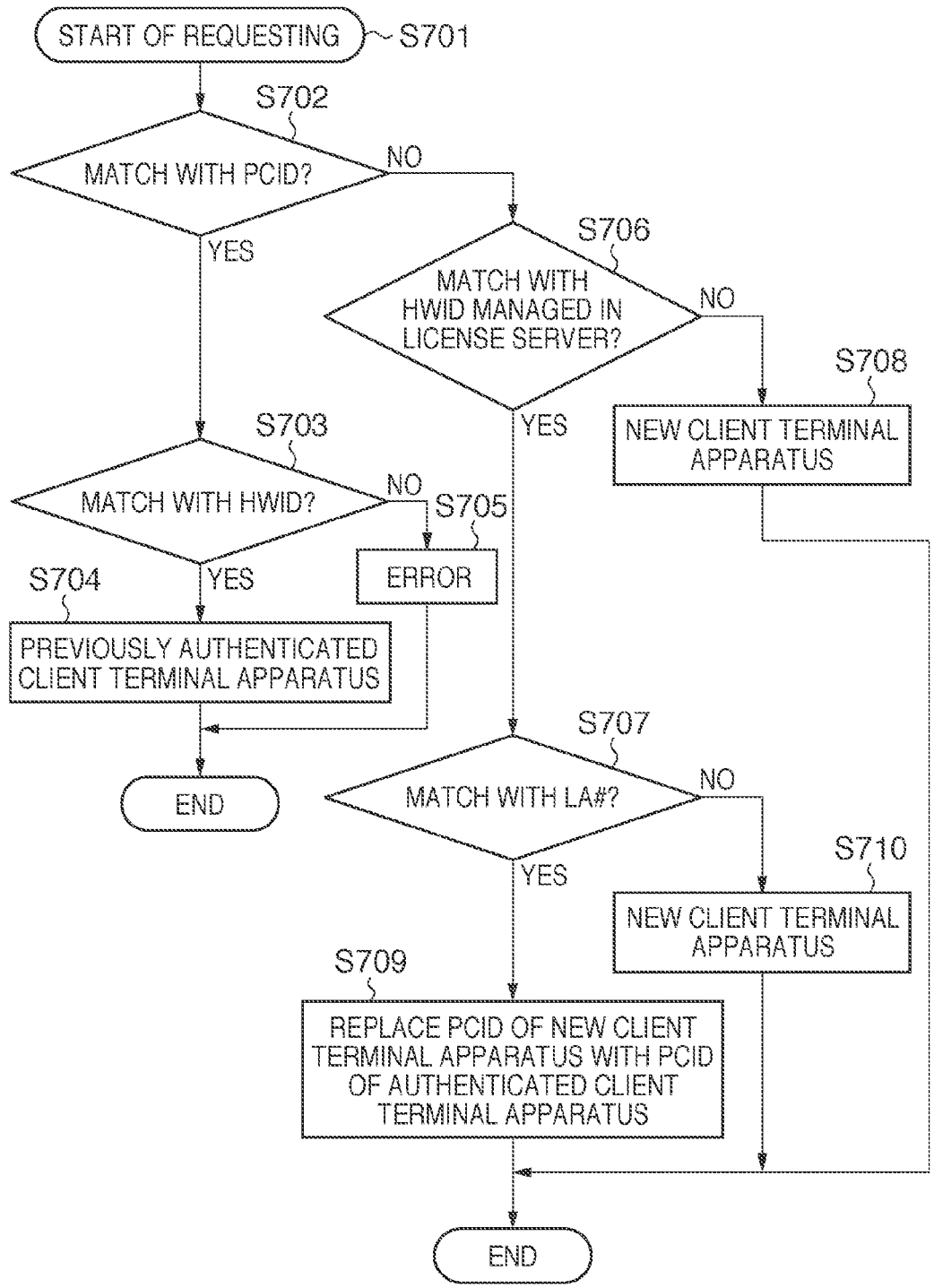
FIG. 7 is a flowchart showing processing for making a determination regarding an ID of a client terminal apparatus.

FIG. 7 is a flowchart showing individual ID determination processing performed for a client terminal apparatuses 102 in the license server 103. This individual ID determination processing is used in situations such as the following.

1. When newly authenticating a license
2. When re-authenticating a previously authenticated license
3. When returning a previously authenticated license to the license server First is a description of the individual ID determination processing taking the example of newly authenticating a license using a specified license access number (LA1) in the first situation "when newly authenticating a license". In S701 in which the requesting starts, the license server 103 receives terminal identification information (PDID1), device information (HWID1), and a license access number (LA1) from the client terminal apparatus 102. Then, the CPU 602 of the license server 103 searches the software information database for the PCID1, and if matching terminal identification information is not found, in S702 the CPU 602 determines that the client terminal apparatus is new and proceeds to the processing of S706. In S706, the CPU 602 searches the device information database for the HWID1, and if the client terminal apparatus is new, the HWID1 is not found in the device information database, and the CPU 602 proceeds to the processing of S708. In S708, the CPU 602 determines that the request is from a new client terminal apparatus, and newly issues a license. At the same time, the CPU 602 registers the PCID1, the HWID1, and the LA1 in the device information database and the software information database.

Next is a description of the individual ID determination processing in the second situation "when re-authenticating a license". The following description takes the example of a case where the hard disk of the client terminal apparatus 102 has been damaged and is replaced. When the hard disk is replaced, the software 305 is re-installed, and the previously authenticated license information is lost. When the software is launched for the first time after the hard disk was replaced, a PCID is created by random generation, and this PCID, which is hereinafter referred to as PCID1', is different from the PCID1 that was used in the previous license authentication. Also, the hard disk information included in the hardware information is different from HWID1, and is hereinafter referred to as HWID1', and since only the hard disk was replaced, if the condition for matching is thought to be the criteria of, for example, whether there is a match between half or more data pieces, HWID1' and HWID1 are determined to be matching. Accordingly, the license is re-authenticated using the LA1 associated with two out of three pieces of device information that are matching.

In S701 in which the requesting starts, information including the PDID1', the HWID1', and the LA1 is transmitted from the client terminal apparatus 102 to the license server 103. In this case, the CPU 602 searches the software information database for the PCID1'. In this case, the PCID1' is not found, and therefore the CPU 602 proceeds from S702 to the processing of S706 and searches the device information database for the HWID1'. In this case, an entry matching the HWID1' is found in the device information database, and therefore the procedure proceeds to the processing of S707. The software information database is searched for the license access number (LA#) that is associated with the HWID1 entry, the associated LA and the LA pertaining to the request for re-authentication are compared, and a determination as to whether they match is made. In this case, a determination is made that the request is from a client terminal apparatus whose license was previously authenticated, the procedure proceeds to the processing of S709, the license is re-authenticated, and at the same time, the terminal identification information (PCID1) from when authentication was previously performed is transmitted to the client terminal apparatus 102. The client terminal apparatus 102 receives the PCID1 and performs processing for replacing the PCID1' with it.

Accordingly, the PCID1 and the HWID1' are stored in the license information in the client terminal apparatus 102. Also, in this case, the re-authenticated license access number LA1 is again stored as license information. The PCID1 that was used when authentication was performed for the first time can therefore be used in subsequent requests to the license server 103.

On the other hand, in the case of determining that a match was not found in S707, the CPU 602 proceeds to the processing of S710 since the HWID matches, but the PCID and LA# are different. Here, a determination is made that the request is from a new client terminal apparatus, and the PCID, the HWID, and the LA# are newly registered in the license server 103.

Next is a description of the case where a license is returned. In the case described below, the license for the LA1 is returned. The client terminal apparatus 102 transmits the PCID1, the HWID1', and the LA1 to the license server 103. In S701, the CPU 602 searches the software information database for the PCID1. In this case, an entry matching the PCID1 is found, and therefore the CPU 602 proceeds from S702 to the processing of S703 and searches the device information database for the HWID1'. Here, an entry matching the HWID1 is found, and therefore the CPU 602 proceeds to the processing of S704, determines that the request is from the client terminal apparatus whose license was previously authenticated, and performs processing for returning the previously authenticated license for the LA1. Here, the return processing is processing for deleting and updating information in the device information database and the software information database that is associated with the LA1.

On the other hand, if the CPU 602 determines that a match was not found in S703, the PCIDs match, but the HWIDs do not match, and therefore the CPU 602 determines that the same PCID has by chance been generated by different client terminal apparatuses, and proceeds to the processing of S705 in which the request results in an error.

Figure 8:
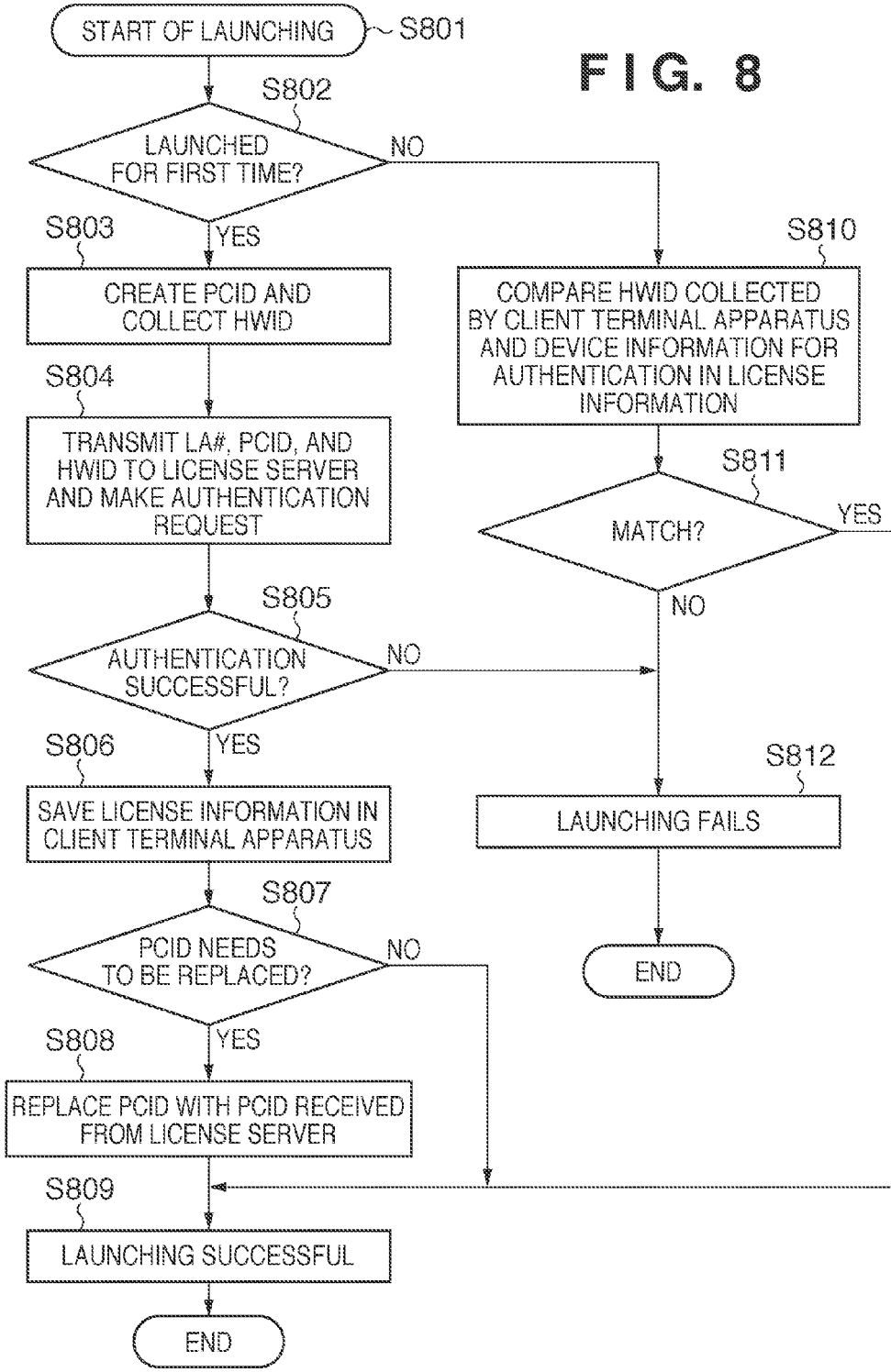
FIG. 8 is a flowchart showing license authentication performed by a client terminal apparatus.

FIG. 8 is a flowchart showing license authentication performed by the client terminal apparatus 102. In S801, the user starts the launching of the software 305 in the client terminal apparatus 102, and thereafter the CPU 501 acquires the license access number that the user has entered, via the input unit 504, for authenticating the license of the software 305. In S802, the CPU 501 determines whether the software is being launched for the first time, that is to say, whether the license information exists in the client terminal apparatus 102. If the result of the determination is that the software is being launched for the first time, the CPU 501 proceeds to the processing of S803, launches the terminal identification information generation program 311, and randomly creates a PCID. The control program 306 is also launched, and the HWID information is collected. The control program 306 transmits this information and the license access number (LA#) that the user input when launching the software to the license server 103.

Next, if it is determined in S805 that the client terminal apparatus that made the request is legitimate and is a new client terminal apparatus according to the processing shown in FIG. 7 that is performed in the license server 103, the procedure proceeds to the processing of S806. In S806, the terminal identification information 308, the device information for authentication 309, and the authenticated license access number are stored as the license information 307 in the client terminal apparatus 102. Next, in S807 a determination is made as to whether this authentication is authentication in which the PCID is to be replaced, that is to say, whether the previously authenticated client terminal apparatus has been re-authenticated. If the authentication is determined to be authentication in which the PCID is to be replaced, the procedure proceeds to the processing of S808, and the PCID is replaced with the PCID transmitted from the license server 103. Then, in S809 the launching is deemed to be successful, and the software is launched.

On the other hand, if the determination result returned from the license server is an error in S805, the launching fails. Also, if a determination is made that the authentication is new authentication or re-authentication in which replacement of the PCID is not necessary in S807, the CPU 501 proceeds to the processing of S808 and launches the software.

Also, if in S802 a determination is made that the software is being launched for the second or subsequent time, that is to say, that the license information exists in the client terminal apparatus 102, the procedure proceeds to the processing of S810. In S810, the control program 306 collects the HWID information, in S811 the HWID information is compared with the device information for authentication 309 included in the license information 307, and the software is successfully launched if they match. Here, the determination regarding matching is processing for determining whether at least half or more of the pieces of device information are the same as those in the license server. On the other hand, if the information does not match, the procedure proceeds to the processing of S812, and the launching of the software fails.

Figure 9:
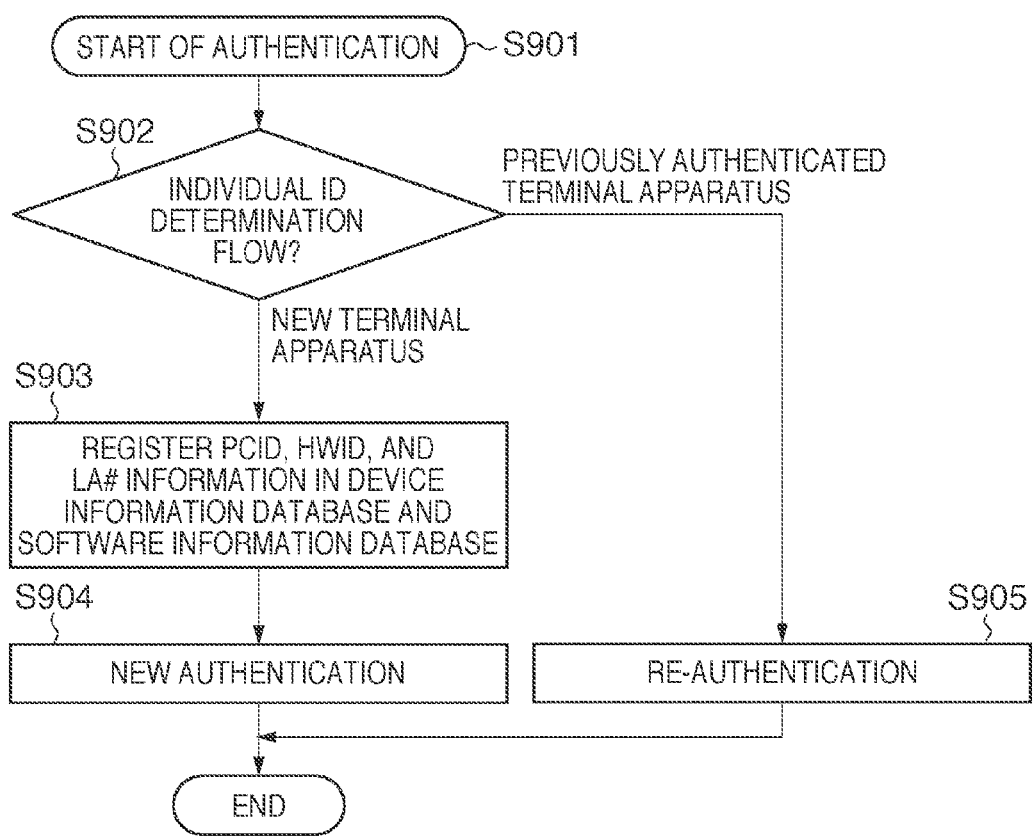
FIG. 9 is a flowchart showing authentication processing performed by the license server.

FIG. 9 is a flowchart showing authentication processing performed by the license server 103. In S901, the requesting starts, and the PCID, HWID, and LA# information are received from the client terminal apparatus 102. Next, in S902 the processing is changed according to the individual ID determination processing shown in FIG. 7. If the client terminal apparatus is determined to be a new client terminal apparatus, the procedure proceeds to the processing of S903, and the PCID, HWID, and LA# information is stored in the databases. Then, in S904 new authentication processing is performed. On the other hand, if the client terminal apparatus is determined to be a previously authenticated client terminal apparatus in S902, processing for re-authenticating a license that has been previously authenticated is performed.

Figure 10:
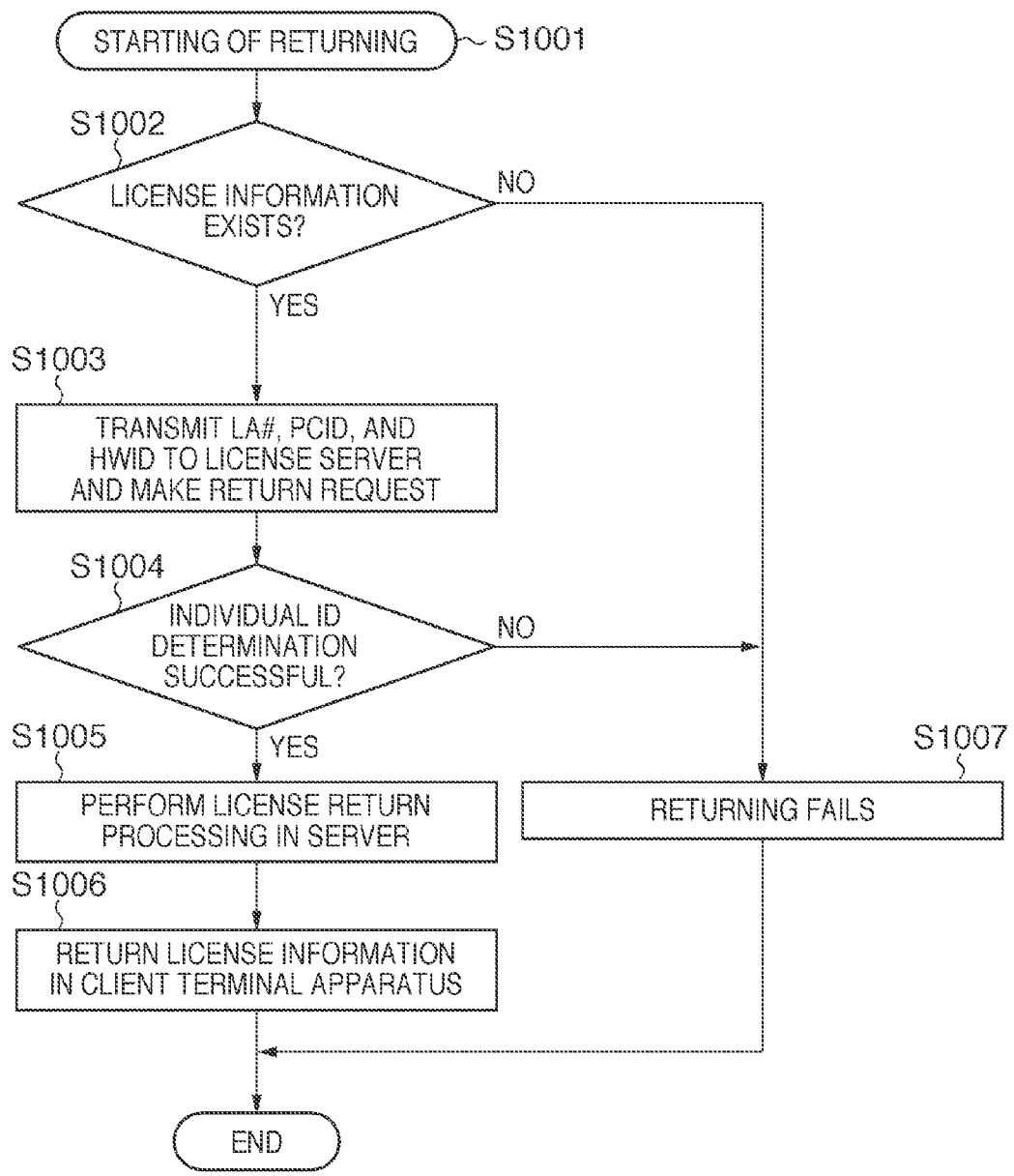
FIG. 10 is a flowchart showing processing for returning an authenticated license.

FIG. 10 is a flowchart showing processing for returning an authenticated license performed by the client terminal apparatus 102. In S1001, returning is started. In S1002, the control program 306 determines whether license information that is to be returned exists in the client terminal apparatus 102. If license information that is to be returned does not exist, the procedure proceeds to the processing of S1007, and the license returning fails. On the other hand, if license information that is to be returned exists, the procedure proceeds to the processing of S1003. In S1003, the control program 306 transmits the license information that is to be returned (the terminal identification information, the device information for authentication, and the authenticated license access number) to the license server 103.

Figure 11:
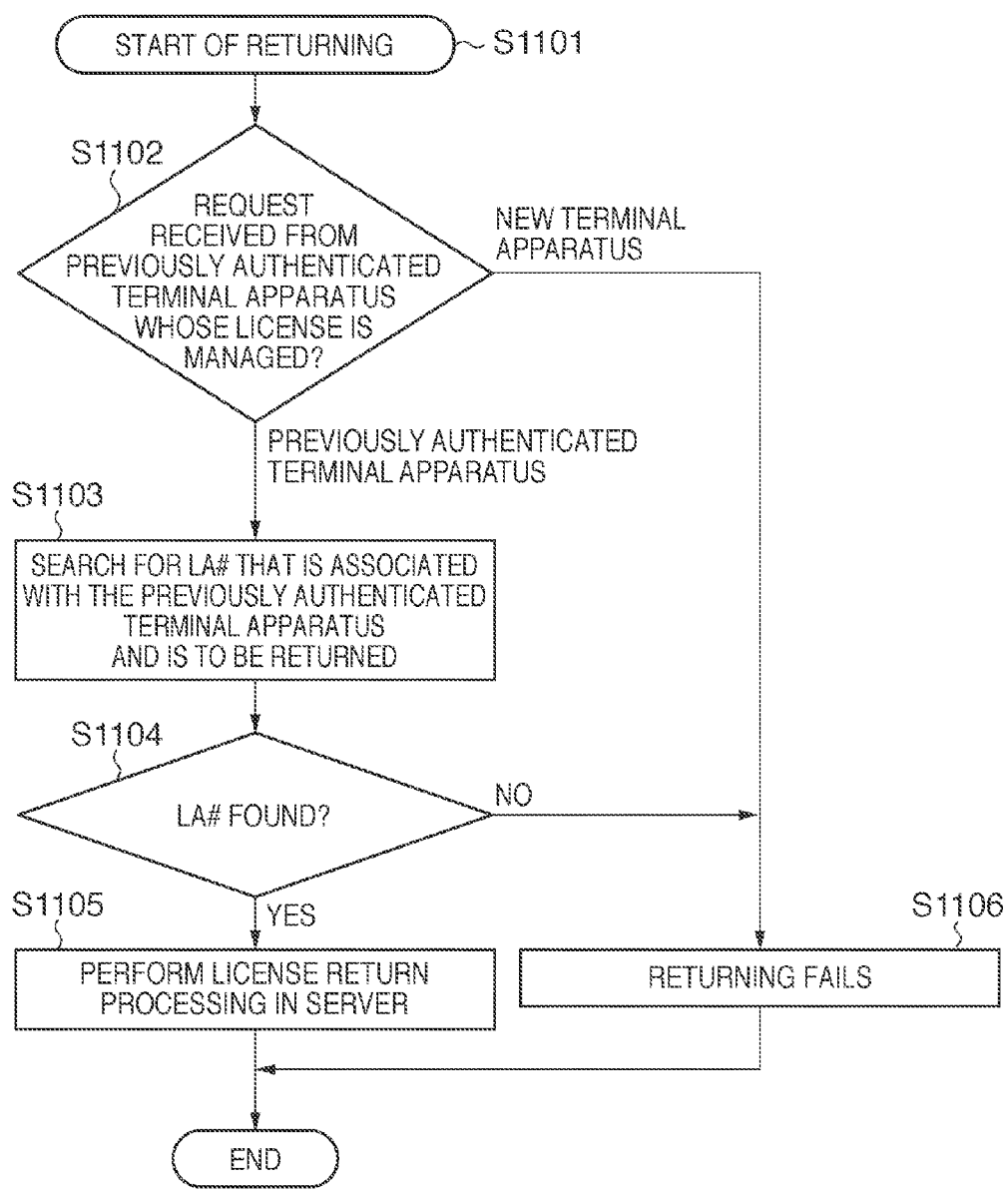
FIG. 11 is a flowchart showing license return processing.

Next, in S1004 the license server 103 determines whether the client terminal apparatus 102 that made the request is a previously authenticated terminal according to the processing shown in FIG. 7. If the result of the determination is that the client terminal apparatus is a previously authenticated terminal, that is to say, if the individual ID determination is successful, the procedure proceeds to the processing of S1005, and later-described processing for returning a license access number in the license server shown in FIG. 11 is performed. Then, in S1006 processing for returning the license of the corresponding license access number in the license information in the client terminal apparatus 102 is performed.

FIG. 11 is a flowchart showing license return processing performed by the license server 103. In S1101, the return processing is started. In S1102, the license server determines whether the client terminal apparatus 102 that made the request is a previously authenticated terminal according to the processing shown in FIG. 7. If the request is from a previously authenticated PC, the procedure proceeds to the processing of S1103, and the software information database is searched for the LA#. Next, in S1104 a determination is made as to whether the LA# that was found in S1103 and is associated with the PCID of the license matches the LA# that is to be returned. If these match, the procedure proceeds to the processing of S1105 in which the corresponding LA# is deleted from the software information database and the return processing is ended.

Also, if the client terminal apparatus that made the request is determined to not be a previously authenticated terminal in S1102, or if a matching LA# is not found in S1104, the procedure proceeds to the processing of S1106, and the license return processing fails.

According to Embodiment 1, a license is re-issued to a terminal apparatus having, among a plurality of pieces of terminal identification information, predetermined terminal identification information that is matching, thus enabling stable license management.

Embodiment 2

In Embodiment 2, a description is given of license management in the case where a client terminal apparatus creates a virtual terminal apparatus (virtual PC) using virtualization software, and the same software as is in the client terminal apparatus is authenticated in the virtual terminal apparatus.

Figure 12:
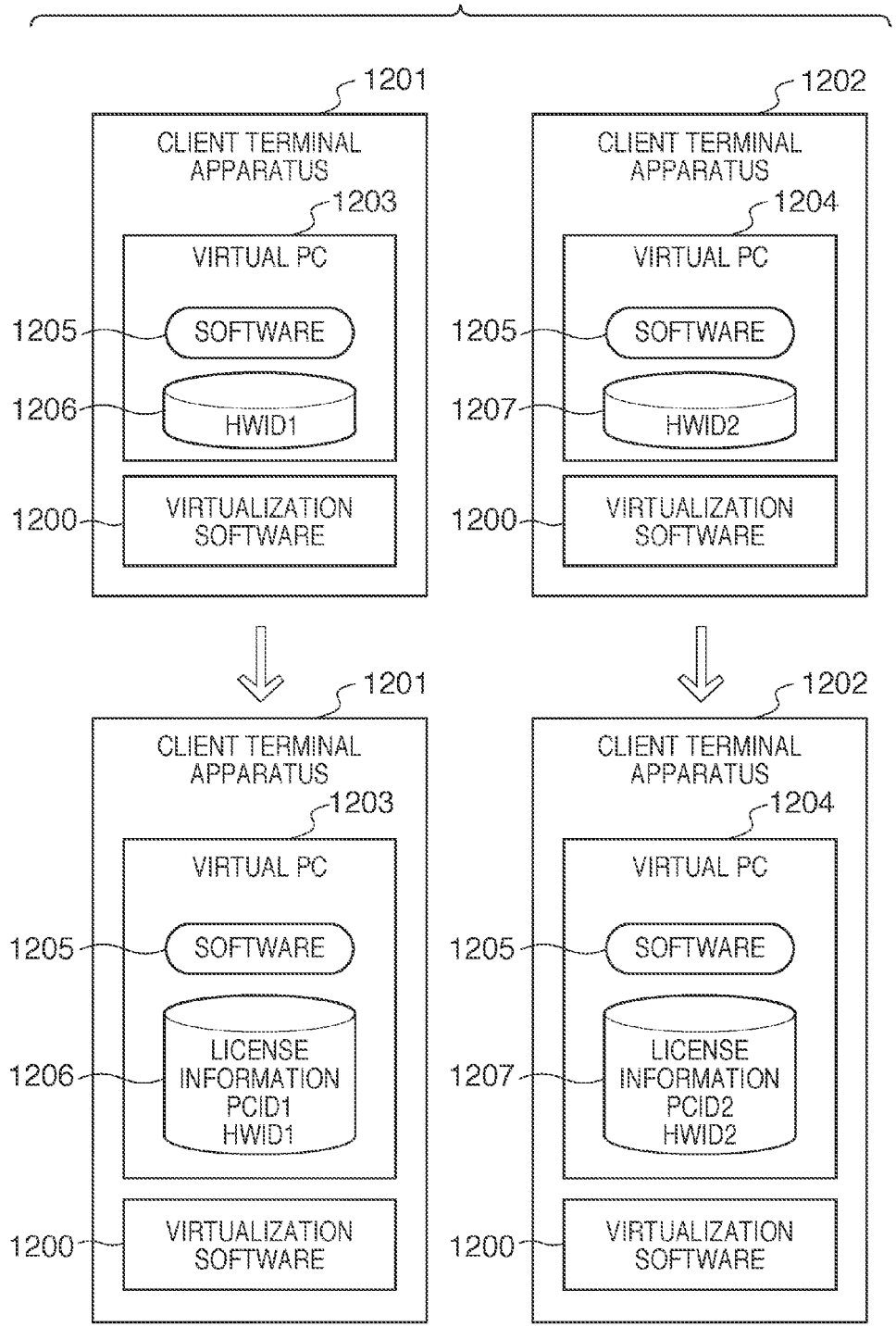
FIG. 12 is a diagram for describing license management according to Embodiment 2.

As shown in FIG. 12, two different client terminal apparatuses 1201 and 1202 use the same virtualization software 1200 to respectively create a virtual PC 1203 and a virtual PC 1204. Then, after the same software 1205 is installed on both the virtual PCs 1203 and 1204, authentication is performed. At this time, likewise to Embodiment 1, in both the virtual PCs 1203 and 1204, terminal identification information (PCID) is randomly generated by the terminal identification information generation program 311 in the client terminal apparatuses 1201 and 1202.

Accordingly, even if the same virtualization software 1200 was used, the terminal identification information included in license information 1206 and 1207 will be unique as with PCID1 and PCID2. Also, since a plurality of pieces of device information is acquired as the device information for authentication, the device information in the virtual PCs will be different, as with HWID1 and HWID2. Accordingly, individual ID determination processing that employs HWID information can be performed without any problems in the license server 103. In this way, licenses can be managed even if the same virtualization software is used.

Embodiment 3

Whereas a description is given in Embodiment 2 of the case where a client terminal apparatus creates a virtual terminal apparatus (virtual PC) using virtualization software, in Embodiment 3 a description is given of the case where an image of the created virtual PC has been copied.

Figure 13:
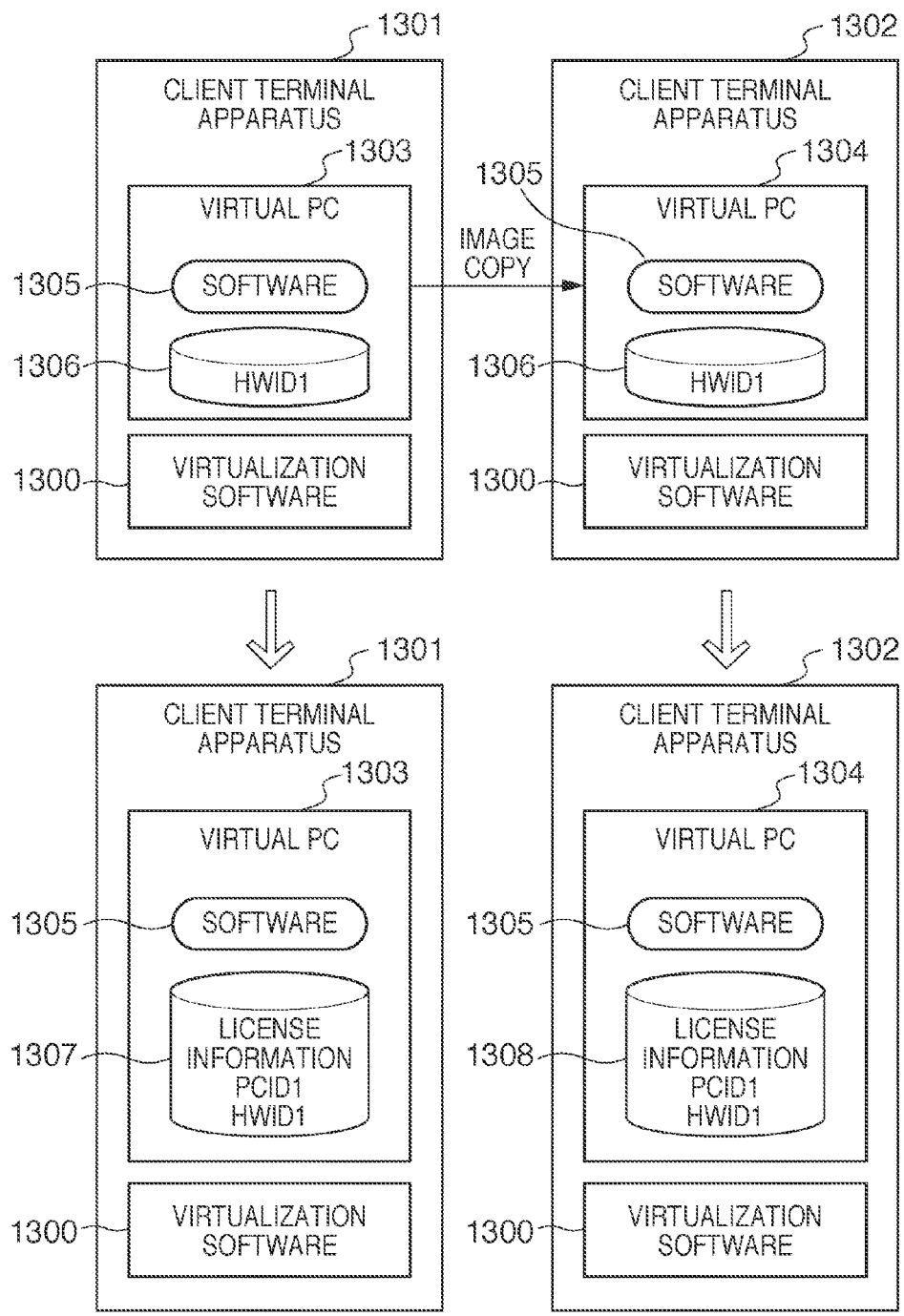
FIG. 13 is a diagram for describing license management according to Embodiment 3.

As shown in FIG. 13, in a client terminal apparatus 1301, virtualization software 1300 is used to create a virtual PC 1303, and a virtual PC 1304 is created by copying an image of the virtual PC 1303 to a client terminal apparatus 1302. License information 1306 has the same values in both of the terminal apparatuses since image copying was performed. Then, the same software 1305 is installed on both the virtual PCs 1303 and 1304, and authentication is performed using the license access number LA1.

First, authentication is performed with the virtual PC 1303. As described in Embodiment 2, in the virtual PC as well, the terminal identification information (PCID) is created as a random value (PCID1) by the terminal identification information generation program 311 in the client terminal apparatus 1301. As described in Embodiment 1, this terminal identification information (PCID1) as a well as device information 1306 (HWID1) and the LA1 of the virtual PC 1303 are transmitted to the license server 103, and authentication is performed.

Next, in the virtual PC 1304, authentication is performed using the license access number LA1. In the virtual PC 1304 as well, the terminal identification information (PCID) is created as a random value (PCID2) by the terminal identification information generation program 311 in the client terminal apparatus 1302. This terminal identification information (PCID2), as well as the device information 1306 (HWID1) and the LA1 of the virtual PC 1304 is transmitted to the license server 103 along with virtual flag information that is described later.

Figure 14:
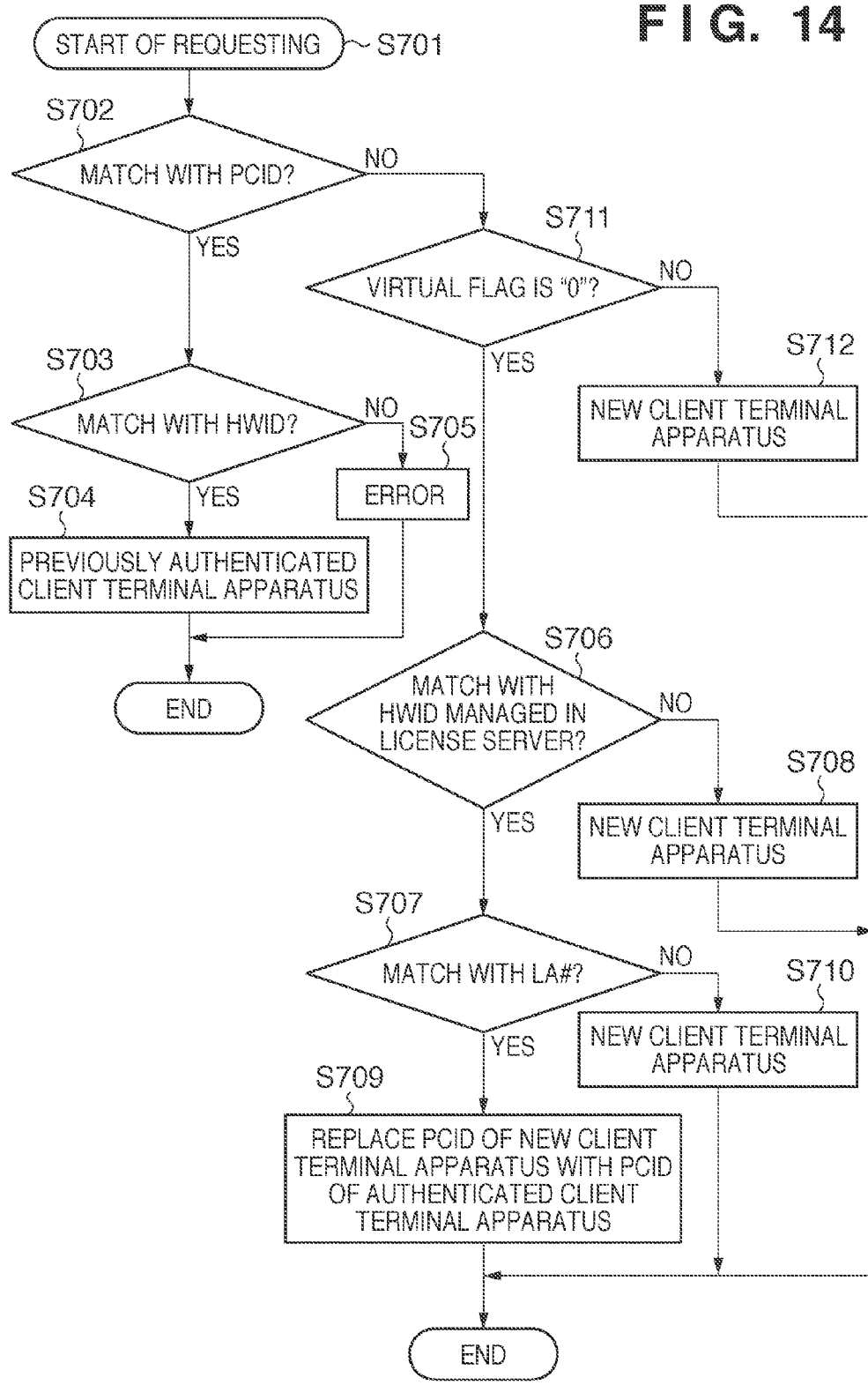
FIG. 14 is a flowchart showing individual ID determination processing according to Embodiment 3.

Next, the license server 103 performs the individual ID determination processing shown in FIG. 14. Note that the processing in S701 to S710 shown in FIG. 14 is the same as the processing shown in FIG. 7, which was described in Embodiment 1.

In Embodiment 3, virtual flag information is added, and if the terminal identification information does not match in S702, the procedure proceeds to the processing of S711, and the virtual flag information is checked. Here, if the virtual flag information is "0", the procedure proceeds to the processing of S706, and processing is performed likewise to Embodiment 1. However, if the virtual flag information is "1", the procedure proceeds to the processing of S712, and the client terminal apparatus is determined to be a new client terminal apparatus. This virtual flag information is information indicating whether the client terminal apparatus that made the request is a virtual PC or a normal PC, and in the case of a virtual PC, the virtual flag information is defined as "1".

In Embodiment 3, in the case where a request is given by the virtual PC 1304, the virtual PC 1304 sets the virtual flag information to "1" and then transmits the request, and the license server 103 determines the virtual PC 1304 to be a new client terminal apparatus.

However, due to adding the determination regarding virtual flag information (S711), when a virtual PC is used, the virtual PC will always be determined to be a new client terminal apparatus, even when re-authentication is necessary, as described in Embodiment 1. Accordingly, the processing for restoring the PCID in S709 is no longer performed. In other words, if the virtual PC is once discarded, re-authentication processing cannot be performed, and the user needs to purchase a license again.

In view of this, if the control program 306 determines that the client terminal apparatus is a virtual PC, the PCID at that time is automatically saved in the local disk 304 as a PCID backup file. The PCID pertaining to the license information can then be restored by restoring the PCID backup file.

Figure 15:
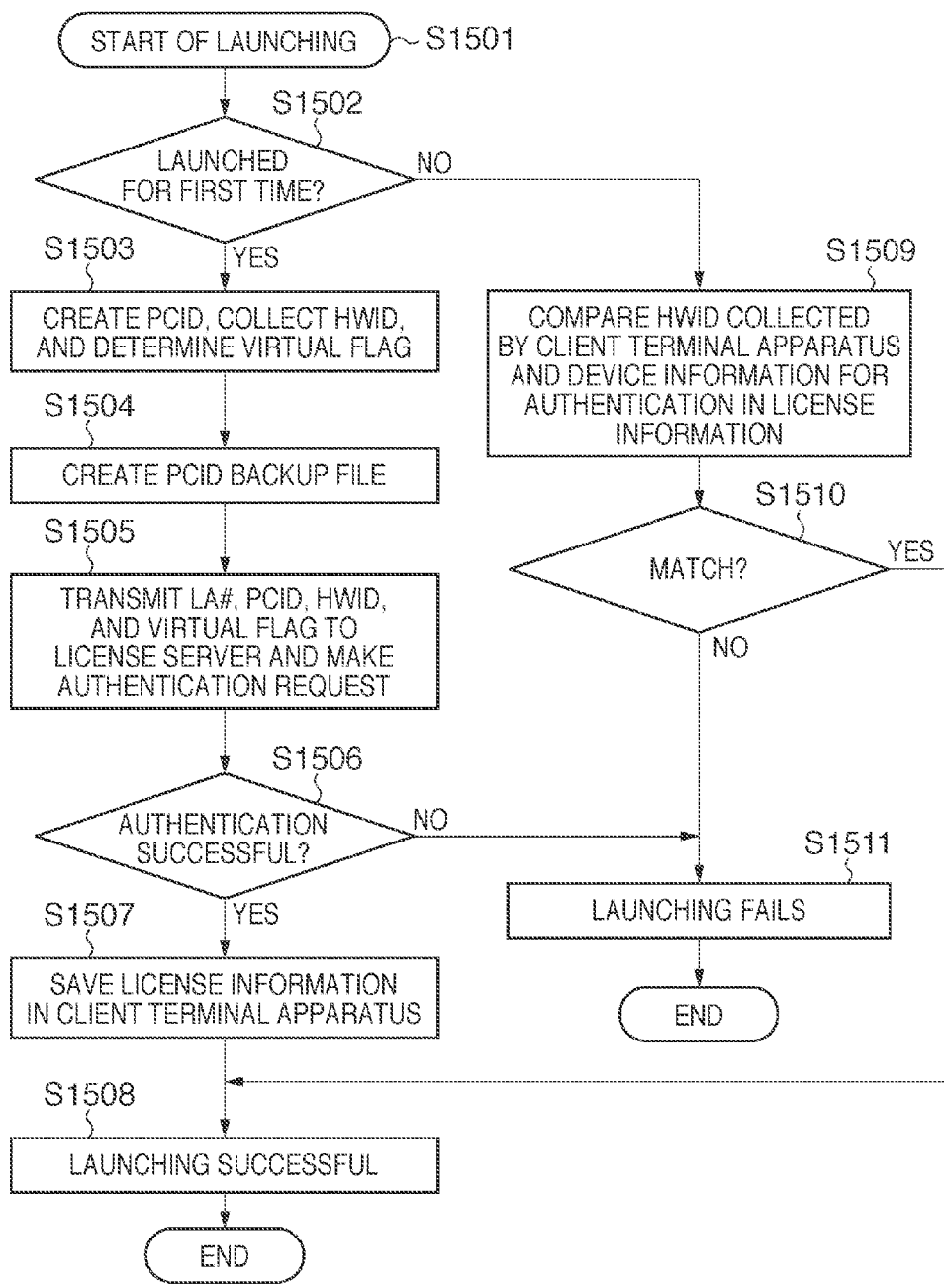
FIG. 15 is a flowchart showing license authentication processing according to Embodiment 3.

FIG. 15 is a flowchart showing license authentication processing performed by a virtual PC in a client terminal apparatus. In S1501, likewise to Embodiment 1, the user starts up the software 305 in the client terminal apparatus 1302, and thereafter a license access number is acquired. In S1502, the CPU 501 determines whether the software is being launched for the first time, that is to say, whether license information exists in the client terminal apparatus 1302. If the result of the determination is that the software is being launched for the first time, the CPU 501 proceeds to the processing of S1503 and launches the terminal identification information generation program 311, and a PCID is randomly created. The control program 306 is also launched, and the HWID information is collected. Furthermore, the control program 306 executes processing for determining whether the client terminal apparatus is a virtual PC, and sets the virtual flag information 312 to "1".

Next, in S1504, the PCID information used at this time is saved in the local disk 304 as a PCID backup file 313. Then in S1505, the terminal identification information, the device information, the virtual flag, and the license access number (LA#) input by the user when launching the software is transmitted to the license server 103.

Next, in S1506, in the license server 103, if the client terminal apparatus that made the request is determined to be a virtual PC according to the processing shown in FIG. 7, the client terminal apparatus is determined to be a new client terminal apparatus, and the procedure proceeds to the processing of S1507. In S1507, in the client terminal apparatus 1302, the terminal identification information (PCID) 308, the device information for authentication (HWID) 309, and the authenticated license access number 310 are stored as the license information 307. Next, in S1508 the software 305 is launched.

Also, in the above-described S1502, if the software is being launched for the second or subsequent time, that is to say, if license information exists in the client terminal apparatus 1302, the procedure proceeds to the processing of S1509. In S1509, the control program 306 collects the HWID information, the collected HWID information is compared with the license device information for authentication 309 in the license information 307 in S1510, and the software is successfully launched in the case of a match. Here, the processing performed for making a determination regarding matching is the same as that in Embodiment 1. On the other hand, if the information is determined to not be matching in S1510, the procedure proceeds to the processing of S1511, and the launching of the software fails.

Next is a description of the case where the virtual PC 1302 is discarded for some sort of reason. In this case, if the PCID backup file 313 exists, the PCID information in the license information can be restored by performing processing for restoring the backup file before authentication of the software license is performed. If license authentication is performed in this state, a match will be found in the above-described PCID check, and therefore the client terminal apparatus is determined to be a previously authenticated client terminal apparatus, and re-authentication can be performed.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-173716, filed Jul. 24, 2009, which is hereby incorporated by reference herein in its entirety.

What is claimed is:

1. A license management system in which a terminal apparatus and a server apparatus are connected via a network, and the server apparatus manages a license of software in the terminal apparatus, the terminal apparatus comprising:

a generation unit that generates terminal identification information for identifying the terminal apparatus; and a transmission unit that, in a case of performing authentication regarding a license, transmits the terminal identification information generated by the generation unit and information regarding hardware that constitutes the terminal apparatus to the server apparatus, and the server apparatus comprising:

an authentication unit that performs authentication regarding a license with respect to the terminal apparatus with use of the terminal identification information transmitted by the transmission unit; and a storage unit that, in a case where the authentication performed by the authentication unit is successful, stores the terminal identification information and the hardware information transmitted by the transmission unit along with the terminal identification information, in association with each other, wherein the authentication unit performs re-authentication regarding a previously issued license with use of the hardware information transmitted by the transmission unit and the hardware information stored by the storage unit, and in a case where, in accordance with successful re-authentication performed by the authentication unit, the terminal apparatus has received, from the server apparatus, terminal identification information stored in the storage unit in association with the hardware information used in the re-authentication, the transmission unit transmits the received terminal identification information and the hardware information when authentication regarding the previously issued license is performed.

2. The license management system according to claim 1, wherein in a case where the terminal identification information transmitted by the transmission unit is not stored in the storage unit, the authentication unit performs re-authentication regarding a previously issued license with use of the hardware information transmitted along with the terminal identification information, and the hardware information stored by the storage unit.

3. The license management system according to claim 1, wherein the transmission unit transmits, to the server apparatus, the terminal identification information generated by the generation unit, the information regarding hardware configuring the terminal apparatus, and virtual flag information indicating whether the terminal apparatus is a virtual terminal apparatus, and in a case where the terminal identification information transmitted by the transmission unit is not stored in the storage unit, and the virtual flag information transmitted along with the terminal identification information indicates that the terminal apparatus is not a virtual terminal apparatus, the authentication unit performs re-authentication regarding a previously issued license with use of the hardware information stored by the storage unit.

4. The license management system according to claim 3, wherein in the terminal apparatus, in a case where the transmission unit transmits virtual flag information indicating that the terminal apparatus is a virtual terminal apparatus to the server apparatus, the terminal identification information is held as a backup.

5. A method for a license management system in which a terminal apparatus and a server apparatus are connected via a network, and the server apparatus manages a license of software in the terminal apparatus, the terminal apparatus executing the steps of:

generating terminal identification information for identifying the terminal apparatus; and transmitting, in a case of performing authentication regarding a license, the terminal identification information generated in the generating step and information regarding hardware that constitutes the terminal apparatus to the server apparatus, and the server apparatus executing the steps of:

performing authentication regarding a license with respect to the terminal apparatus with use of the terminal identification information transmitted in the transmitting step; and storing, in a case where the authentication performed in the authenticating step is successful, the terminal identification information and the hardware information transmitted in the transmitting step along with the terminal identification information, in association with each other, wherein in the authenticating step, re-authentication regarding a previously issued license is performed with use of the hardware information transmitted in the transmitting step and the hardware information stored in the storing step, and in a case where, in accordance with successful re-authentication performed in the authenticating step, the terminal apparatus has received, from the server apparatus, terminal identification information stored in the storing step in association with the hardware information used in the re-authentication, the received terminal identification information and the hardware information are transmitted in the transmitting step when authentication regarding the previously issued license is performed.

6. A server apparatus that is connected to a terminal apparatus via a network and manages a license of software in the terminal apparatus, the server apparatus comprising:

a reception unit that receives, from the terminal apparatus, terminal identification information generated by the terminal apparatus, and information regarding hardware that constitutes the terminal apparatus;

an authentication unit that performs authentication regarding a license with respect to the terminal apparatus with use of the terminal identification information received by the reception unit; and a storage unit that, in a case where the authentication performed by the authentication unit is successful, stores the terminal identification information and the hardware information received by the reception unit along with the terminal identification information, in association with each other, wherein the authentication unit performs re-authentication regarding a previously issued license with use of the hardware information received by the reception unit and the hardware information stored by the storage unit, and in accordance with successful re-authentication performed by the authentication unit, the terminal identification information stored in the storage unit in association with the hardware information used in the re-authentication is transmitted to the terminal apparatus.

7. A method performed in a server apparatus that manages a license of software, comprising the steps of:

receiving, from a terminal apparatus on a network, terminal identification information generated by the terminal apparatus, and information regarding hardware that constitutes the terminal apparatus;

performing authentication regarding a license with respect to the terminal apparatus with use of the received terminal identification information; and in a case where the authentication is successful, storing the terminal identification information and the hardware information received along with the terminal identification information, in association with each other, wherein in the authenticating step, re-authentication regarding a previously issued license is performed with use of the hardware information received in the receiving step and the hardware information stored in the storing step, and in accordance with successful re-authentication, the terminal identification information stored in the storing step in association with the hardware information used in the re-authentication is transmitted to the terminal apparatus.

8. A non-transitory computer readable storage medium on which is stored a computer program for making a computer execute a method for managing a license of software, the method comprising the steps of:

receiving, from a terminal apparatus on a network, terminal identification information generated by the terminal apparatus, and information regarding hardware that constitutes the terminal apparatus;

performing authentication regarding a license with respect to the terminal apparatus with use of the received terminal identification information; and in a case where the authentication is successful, storing the terminal identification information and the hardware information received along with the terminal identification information, in association with each other, wherein in the authenticating step, re-authentication regarding a previously issued license is performed with use of the hardware information received in the receiving step and the hardware information stored in the storing step, and in accordance with successful re-authentication, the terminal identification information stored in the storing step in association with the hardware information used in the re-authentication is transmitted to the terminal apparatus.

* * * * *